United States Patent
Patel et al.

(10) Patent No.: US 9,674,808 B1
(45) Date of Patent: *Jun. 6, 2017

(54) METHOD AND APPARATUS FOR EARLY FREQUENCY SYNCHRONIZATION IN LTE WIRELESS COMMUNICATION SYSTEMS

(71) Applicant: MBIT WIRELESS, INC., Newport Beach, CA (US)

(72) Inventors: Bhaskar Patel, San Clemente, CA (US); Krishnavelan Sivaraman, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,967

(22) Filed: Oct. 21, 2015

(51) Int. Cl.
| | |
|---|---|
| H04J 3/06 | (2006.01) |
| H04L 27/10 | (2006.01) |
| H04W 56/00 | (2009.01) |
| H04L 27/26 | (2006.01) |
| H04W 72/04 | (2009.01) |

(52) U.S. Cl.
CPC ..... *H04W 56/0015* (2013.01); *H04W 72/044* (2013.01)

(58) Field of Classification Search
CPC ............ H04J 11/0076; H04W 56/001
USPC ......................................... 370/350
See application file for complete search history.

(56) References Cited

U.S. PATENT DOCUMENTS

| | | | | |
|---|---|---|---|---|
| 2006/0233270 A1* | 10/2006 | Ahn | ............... | H04B 7/0851 375/260 |
| 2009/0303067 A1* | 12/2009 | Sharp | ............... | G01C 21/206 340/686.1 |
| 2014/0079248 A1* | 3/2014 | Short | ............... | G10L 21/0272 381/119 |
| 2014/0321450 A1* | 10/2014 | Zhang | ............... | H04L 7/0016 370/350 |

* cited by examiner

*Primary Examiner* — Asad Nawaz
*Assistant Examiner* — Jason Harley
(74) *Attorney, Agent, or Firm* — Lerner, David, Littenberg, Krumholz & Mentlik, LLP

(57) ABSTRACT

In a wireless communication system, a client terminal may first establish time and frequency synchronization with the network. While establishing the time and frequency synchronization, a client terminal may need to detect additional parameters about the network, such as physical cell identity, before it can initiate communication with the wireless communication system. Detecting the network parameters in presence of time and frequency offsets increases the complexity of the initial cell search procedure that includes time and frequency synchronization as well as detection of network parameters. A method and apparatus are disclosed that achieve frequency synchronization using frequency domain cross-correlation earlier in the cell search procedure, which in turn reduces the complexity and improves the performance of the latter stages of cell search procedure and the overall performance of the client terminal.

20 Claims, 18 Drawing Sheets

METHOD AND APPARATUS FOR EARLY FREQUENCY SYNCHRONIZATION IN LTE WIRELESS COMMUNICATION SYSTEMS

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be in the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred herein as OFDM signal.

In addition to the purposes mentioned above, the CP is often used for frequency offset estimation at the receiver. Any frequency offset at the receiver relative to the center frequency of the transmitted signal causes the phase of the received signal to change linearly as a function of time. The two parts of an OFDM signal that are identical at the transmitter, i.e., the CP and the tail portion of the OFDM symbol, may undergo different phase change at the receiver due to the frequency offset. Therefore, the frequency offset can be estimated by performing correlation between the CP and the tail portion of an OFDM signal. The angle of the CP correlation indicates the amount of phase rotation that is accumulated over the duration of an OFDM symbol. This accumulated phase rotation may then used for frequency offset estimation.

The frequency offset at the receiver during initial synchronization may be very high. Furthermore, since the client terminal may not be synchronized to any base station during initial synchronization, the OFDM symbol boundaries are not known to the client terminal. In wireless communication system deployments where frequency reuse is employed, the signals from several base stations may be superimposed. In some cases, the various base stations may not be time synchronized, i.e., the OFDM symbol boundaries for the different cells may not be time aligned. Even if the OFDM symbol boundaries are time aligned at the base stations, the propagation delays from different base stations to the client terminal may be different and therefore the OFDM symbol timing may not be time aligned at the client terminal receiver. Furthermore, in some wireless communication systems, such as $3^{rd}$ Generation Partnership Project (3GPP) Long Term Evolution (LTE) or LTE-Advanced wireless communication systems, an option of using different CP lengths exists and the exact CP in use may not be known a priori to the client terminal. In addition, the different base stations whose signals may be superimposed may be using different CP lengths. The overall received signal scenario is illustrated in FIG. 5. In case of TDD systems since the same frequency is used for transmit and receive, at power up the client terminal may not be aware of the boundary between DL and UL. In case of TDD systems, the significant power difference between DL and UL may create challenges in performing frequency offset estimation and may lead to inaccurate frequency offset.

Most wireless communication systems may employ some form of framing in the air interface. For example, 10 ms radio frames are used in the 3GPP LTE wireless communication systems and each radio frame comprises 10 subframes as shown in FIG. 6. Each subframe in turn consists of two slots and each slot consists of 6 or 7 OFDM symbols depending on the type of CP used as shown in FIG. 6. In the 3GPP LTE wireless communication system, two different CP lengths are used and they are referred to as Normal CP and Extended CP. In wireless communication systems, normally the specific air interface frame structure repeats itself over certain periodicity.

The 3GPP LTE wireless communication system uses the following synchronization signals to assist the client terminal in achieving time and frequency synchronization as well as the detection of physical layer cell identity:

Primary Synchronization Signal (PSS)
Secondary Synchronization Signal (SSS)

The positions of the PSS and SSS are illustrated in FIG. 7 for FDD air-interface of a 3GPP LTE wireless communication system. Note that the figure shows the position of the PSS and SSS for both the Normal CP and Extended CP. FIG. 8 illustrates the PSS and SSS positions for TDD air-interface of 3GPP LTE wireless communication system. The PSS and SSS for different cells may be different as described below.

The different PSS and SSS are identified by different signal sequences used for transmission. Specifically, 504 physical cell identities are defined in 3GPP LTE wireless communication system specifications and they are organized into 168 groups with three identities in each group. The SSS sequence identifies the physical cell identity group and PSS identifies the physical cell identity within a group. Detecting a physical cell identity requires the detection of both the PSS and the SSS.

The PSS sequence in frequency domain is a length 63 Zadoff-Chu sequence extended with five zeros on each side and mapped to central 72 sub-carriers as shown in FIG. 9. The Direct Current (DC) subcarrier is not used. In 3GPP LTE wireless communication system three different PSS sequences are used with Zadoff-Chu root indices 24, 29 and 34 corresponding to cell identity 0, 1 and 2 respectively within the physical cell identity group. The exact PSS sequences are defined in the 3GPP LTE specification TS 36.211 "Physical Channels and Modulation." The time domain PSS signal may be obtained by performing Inverse Discrete Fourier Transform (IDFT) of the frequency domain PSS. The two time domain PSS instances present within a 10 ms radio frame as shown in FIG. 7 and FIG. 8 are identical.

The SSS sequences in frequency domain are generated by frequency interlacing of two length-31 M-sequences X and Y, each of which may take 31 different M-values. The SSS is extended with five zeros on each side and mapped to central 72 sub-carriers as shown in FIG. 10. The DC subcarrier is not used. In 3GPP LTE wireless communication system, 168 valid combinations of X and Y are defined corresponding to 168 different physical cell identity groups. The time domain SSS signal may be obtained by performing IDFT of the frequency domain SSS. The two SSS sequences present in a 10 ms radio frame are different, namely $SSS_1$ and $SSS_2$ as shown in FIG. 7 and FIG. 8, which allows the client terminal to detect 10 ms radio frame timing from reception of a single SSS. The only difference between $SSS_1$ and $SSS_2$ is that the two M-sequences X and Y used in $SSS_1$ are swapped in $SSS_2$. Relative timing between SSS and PSS depends upon CP type and duplexing type as shown in FIG. 7 and FIG. 8.

Since OFDM symbol synchronization may be achieved at the end of PSS search, frequency domain processing may be employed for further analysis, such as SSS detection.

The SSS search has to handle timing and frequency offset ambiguities in addition to other system unknowns such as CP type and duplexing type. The relative timing (in terms of number of samples) between SSS and PSS varies depending upon CP and duplexing type. Multiple SSS search attempts may be required to resolve unknown system parameters such as CP type and duplexing type. If CP type is known prior to SSS detection, for example using CP correlator, corresponding SSS detection attempt may be skipped. The PSS detection may result in multiple possible PSS positions being detected due to the presence of multiple cells surrounding the client terminal.

Frequency offset in OFDM systems generally manifests itself in two components commonly referred as integer frequency offset and fractional frequency offset. Integer frequency offset refers to the frequency offset in terms of integral number of the subcarriers and the fractional frequency offset refers to the frequency offset remaining after excluding the integer frequency offset. In a 3GPP LTE wireless communication system the frequency spacing between subcarriers is 15 kHz. Therefore, for example, a frequency offset of 35 kHz at the client terminal manifests itself as two subcarrier offset (30 kHz) and a fractional frequency offset of 5 kHz.

Fractional frequency offset may be compensated by estimating fractional frequency offset using conventional methods such as CP correlation. In conventional systems, the integer frequency offset may be detected in frequency domain by attempting to decode SSS with different assumptions about different SSS frequency bin positions.

The SSS detection requires selection of one out of the 168 possible valid combinations. When coupled with additional unknowns such as the integer frequency offset, the CP type, the duplexing type, the number of search candidates for SSS becomes excessive leading to high complexity and high power consumption. To handle integer frequency offset of ±30 kHz (two subcarrier spacing), the number of SSS frequency domain processing iterations required is five, which corresponds to the nominal position and two subcarrier offsets in both positive and negative directions. When the CP and duplexing type are not known, the number of combinations increases to 20.

SUMMARY

A method and apparatus are disclosed that may achieve integer frequency offset estimation and compensation before the start of SSS search. This in turn may reduce the complexity of the SSS detection as well. A fake cell detection is defined herein as successful SSS detection for a signal when there is no real cell present at the detected SSS position. A detected fake cell may be reported by the client terminal to the network. The network in turn may do a handover of the client terminal to the reported cell and, since it is not a real cell, the handover may fail leading to reduced performance. The disclosed method may also reduce the potential fake cells that may be detected when SSS detection is attempted over a large number of possible candidates corresponding to different integer frequency offsets.

In accordance with an aspect of the present invention, a method for frequency synchronization of a signal may include controlling, by a processing device: extracting, from time domain samples of the signal, samples corresponding to a strongest detected Primary Synchronization Signal (PSS); compensating the extracted samples for a fractional frequency offset detected from the time domain samples, by applying a phase rotation corresponding to a negative of the fractional frequency offset; converting the compensated extracted samples to frequency domain samples; frequency domain cross-correlating a replica of a frequency domain PSS corresponding to a detected PSS index with the frequency domain samples, over a predetermined number of frequency bin positions, to obtain frequency domain PSS cross-correlations; and determining a frequency bin position of the frequency bin positions corresponding to a frequency domain PSS cross-correlation of the frequency domain PSS cross-correlations having a maximum magnitude, wherein the determined frequency bin position indicates an integer frequency offset in the signal.

In one alternative, the replica of the frequency domain PSS may be generated dynamically.

In one alternative, the replica of the frequency domain PSS may be predetermined and stored in a look-up table.

In one alternative, the frequency domain cross-correlating may be over the predetermined number of frequency bin positions around a nominal position of the PSS.

In one alternative, the method may include controlling, by the processing device: determining a frequency offset of the signal by combining the integer frequency offset indicated by the determined frequency bin position with the fractional frequency offset, and searching the signal compensated by the frequency offset for a Secondary Synchronization Signal (SSS).

In one alternative, the strongest detected PSS may correspond to a strongest PSS time domain correlation. In one alternative, the strongest PSS time domain correlation may be determined from a magnitude of a time domain cross-correlation of the PSS.

In accordance with an aspect of the present invention, an apparatus for frequency synchronization of a signal may include circuitry configured to control: extracting, from time domain samples of the signal, samples corresponding to a strongest detected Primary Synchronization Signal (PSS); compensating the extracted samples for a fractional frequency offset detected from the time domain samples, by applying a phase rotation corresponding to a negative of the fractional frequency offset; converting the compensated extracted samples to frequency domain samples; frequency domain cross-correlating a replica of a frequency domain PSS corresponding to a detected PSS index with the frequency domain samples, over a predetermined number of frequency bin positions, to obtain frequency domain PSS cross-correlations; and determining a frequency bin position of the frequency bin positions corresponding to a frequency domain PSS cross-correlation of the frequency domain PSS cross-correlations having a maximum magnitude, wherein the determined frequency bin position indicates an integer frequency offset in the signal.

In one alternative of the apparatus, the replica of the frequency domain PSS may be generated dynamically.

In one alternative of the apparatus, the replica of the frequency domain PSS may be predetermined and stored in a look-up table.

In one alternative of the apparatus, the frequency domain cross-correlating may be over the predetermined number of frequency bin positions around a nominal position of the PSS.

In one alternative of the apparatus, the circuitry may be configured to control: determining a frequency offset of the signal by combining the integer frequency offset indicated by the determined frequency bin position with the fractional frequency offset, and searching the signal compensated by the frequency offset for a Secondary Synchronization Signal (SSS).

In one alternative of the apparatus, the strongest detected PSS may correspond to a strongest PSS time domain correlation.

In one alternative of the apparatus, the strongest PSS time domain correlation may be determined from a magnitude of a time domain cross-correlation of the PSS.

In accordance with an aspect of the present invention, a wireless communication device may include a receiver to receive a signal; and a processing device. The processing device may be configured to control frequency synchronization of the signal by controlling: extracting, from time domain samples of the signal, samples corresponding to a strongest detected Primary Synchronization Signal (PSS); compensating the extracted samples for a fractional frequency offset detected from the time domain samples, by applying a phase rotation corresponding to a negative of the fractional frequency offset; converting the compensated extracted samples to frequency domain samples; frequency domain cross-correlating a replica of a frequency domain PSS corresponding to a detected PSS index with the frequency domain samples, over a predetermined number of frequency bin positions, to obtain frequency domain PSS cross-correlations; and determining a frequency bin position of the frequency bin positions corresponding to a frequency domain PSS cross-correlation of the frequency domain PSS cross-correlations having a maximum magnitude, wherein the determined frequency bin position indicates an integer frequency offset in the signal.

In one alternative of the device, the replica of the frequency domain PSS may be generated dynamically.

In one alternative of the device, the replica of the frequency domain PSS may be predetermined and stored in a look-up table.

In one alternative of the device, the frequency domain cross-correlating may be over the predetermined number of frequency bin positions around a nominal position of the PSS.

In one alternative of the device, the processing device may be configured to control: determining a frequency offset of the signal by combining the integer frequency offset indicated by the determined frequency bin position with the fractional frequency offset, and searching the signal compensated by the frequency offset for a Secondary Synchronization Signal (SSS).

In one alternative of the device, the strongest detected PSS may correspond to a strongest PSS time domain correlation.

DETAILED DESCRIPTION

Figure 1:
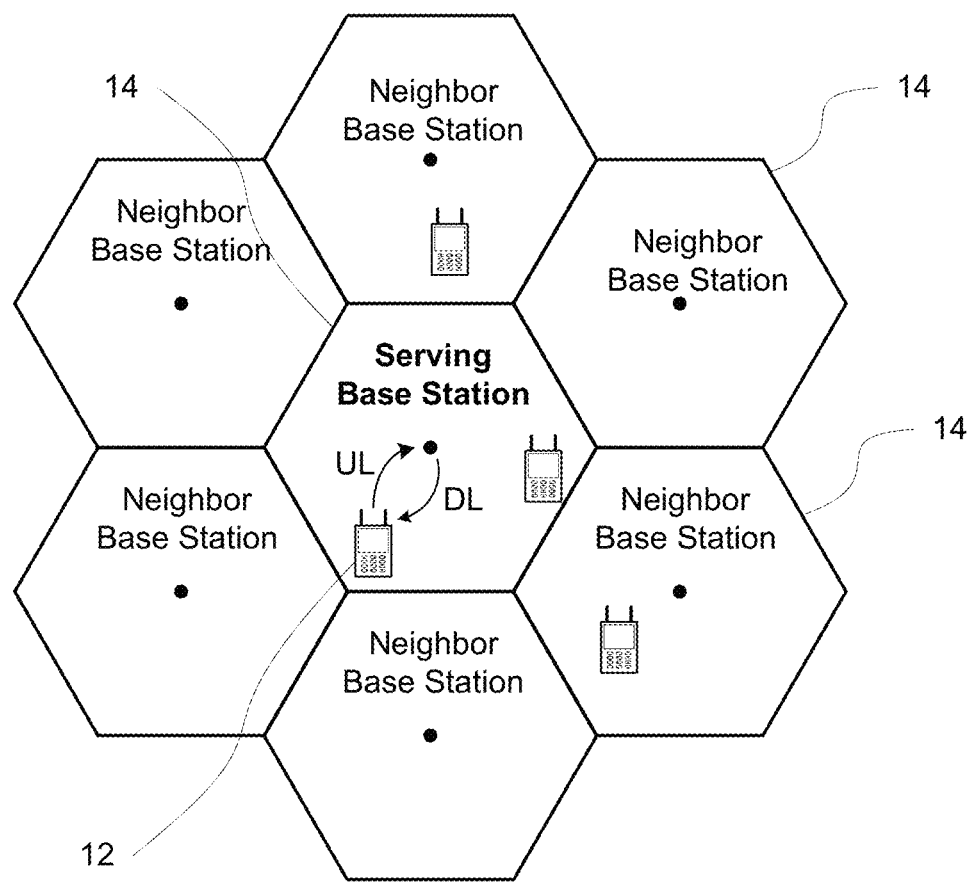
FIG. 1 illustrates a conventional wireless cellular communication system.
Figure 2:
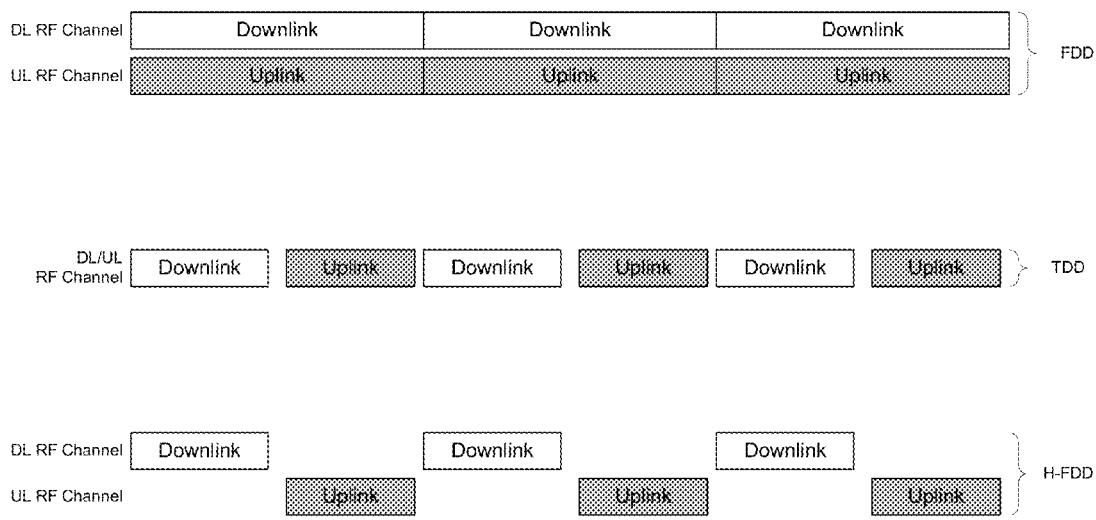
FIG. 2 illustrates FDD, TDD and H-FDD duplexing techniques.
Figure 3:
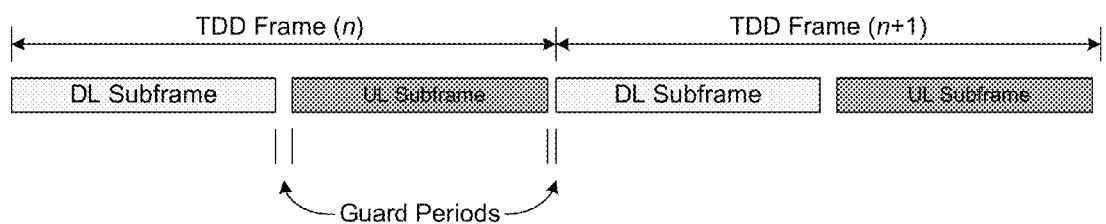
FIG. 3 illustrates a TDD frame consisting of DL portions and UL portions.
Figure 4:
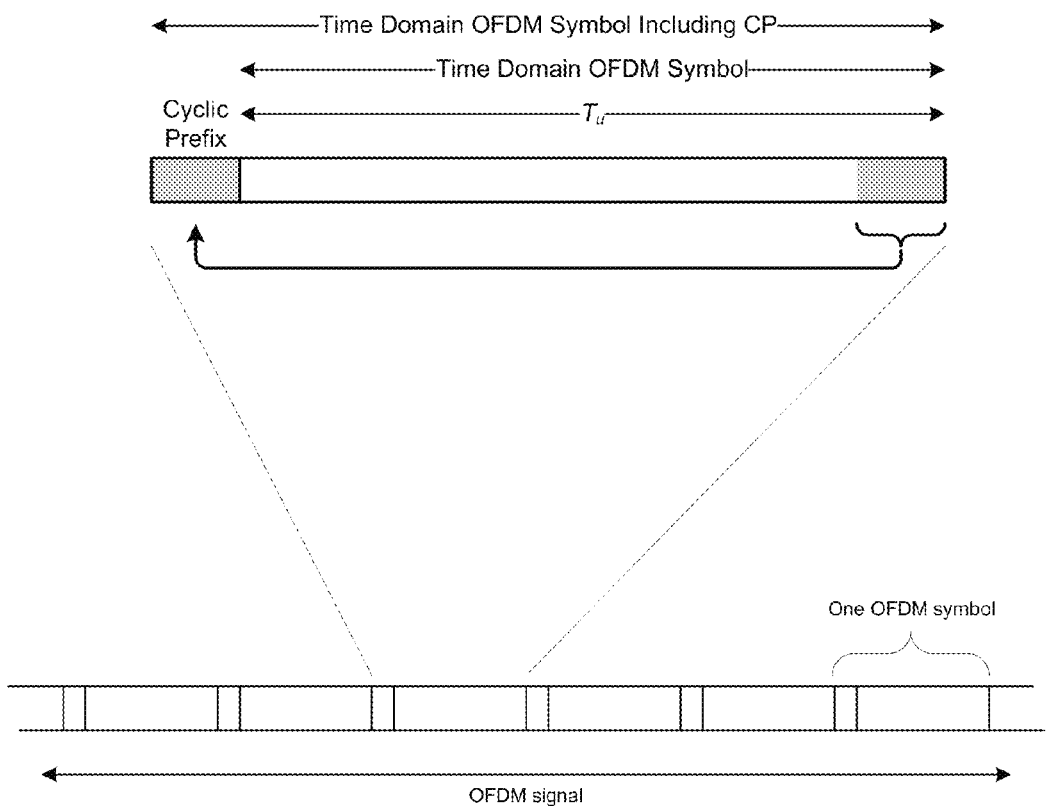
FIG. 4 illustrates an OFDM symbol with Cyclic Prefix Insertion.
Figure 5:
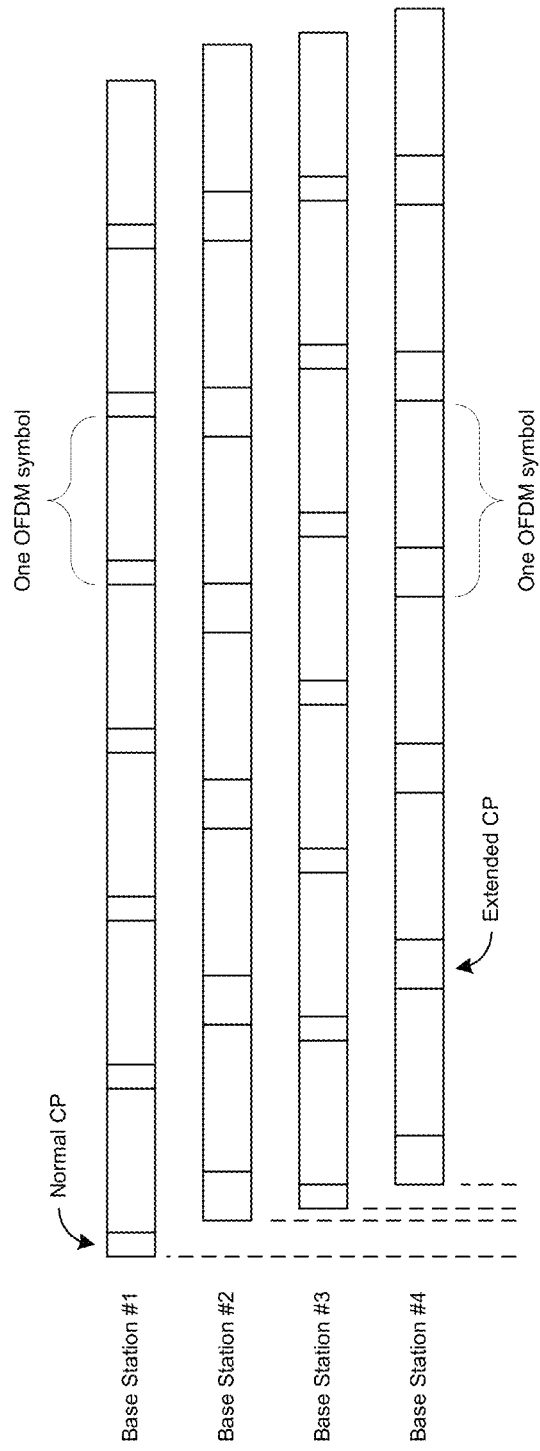
FIG. 5 illustrates OFDM signals from a set of base stations that are not time synchronized and using different CP lengths.
Figure 6:
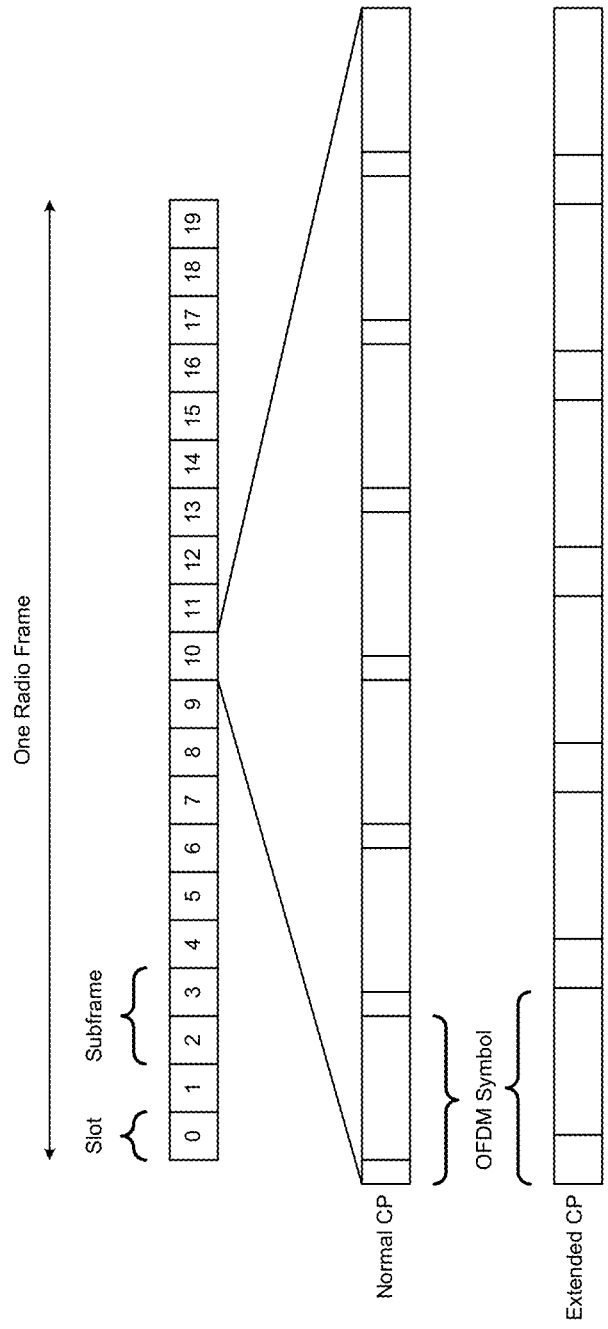
FIG. 6 illustrates the frame structure of the air interface of the 3GPP LTE wireless communication system.
Figure 7:
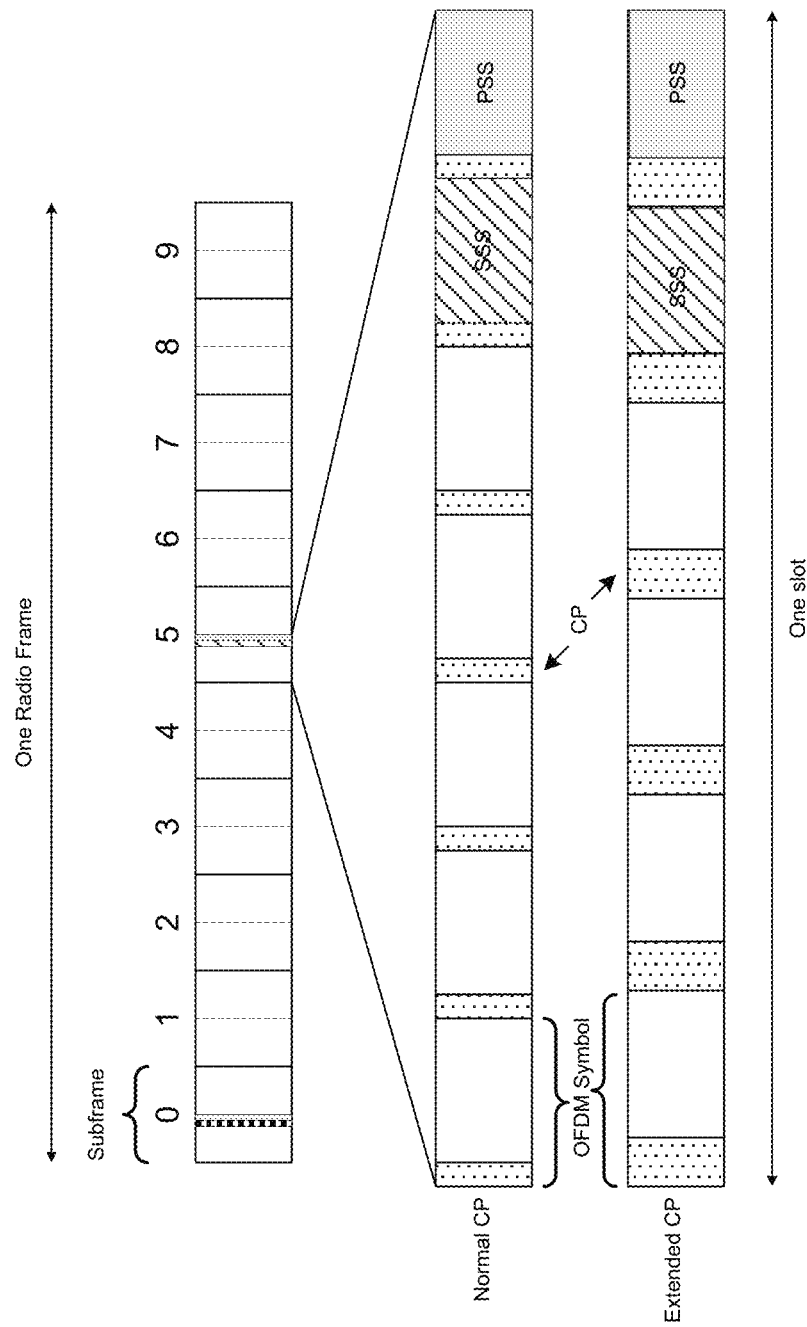
FIG. 7 illustrates the locations of PSS and SSS for Normal CP and Extended CP in case of FDD 3GPP LTE wireless communication system.
Figure 8:
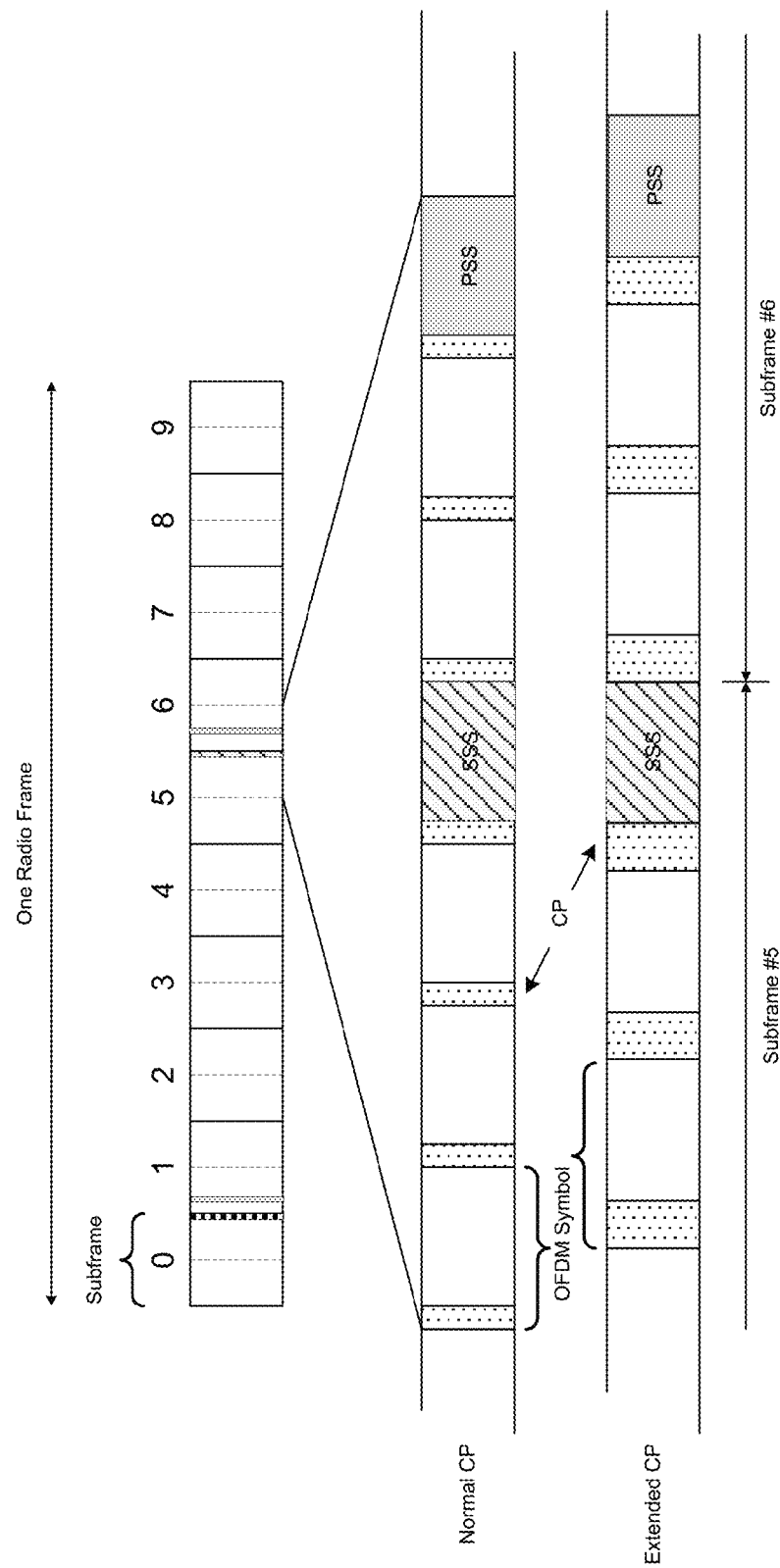
FIG. 8 illustrates the locations of PSS and SSS for Normal CP and Extended CP in case of TDD 3GPP LTE wireless communication system.
Figure 9:
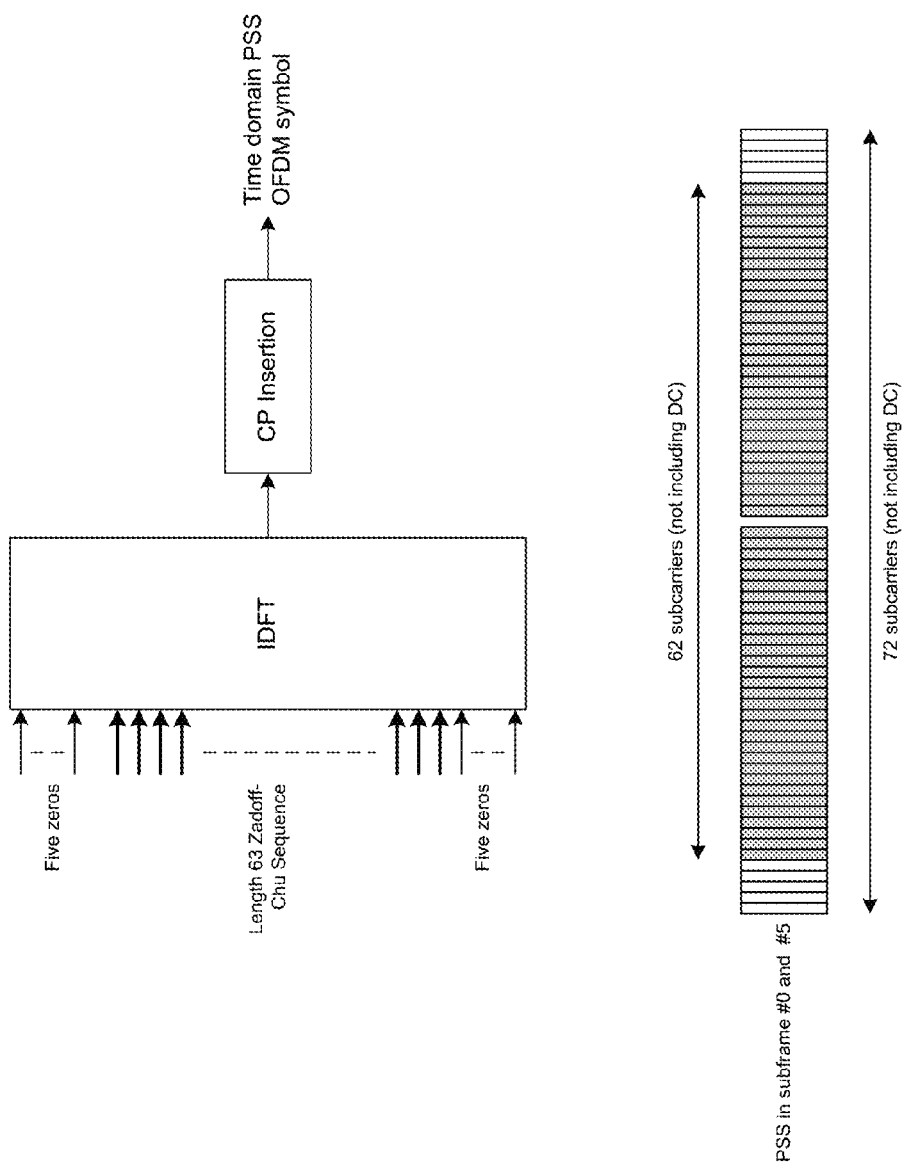
FIG. 9 illustrates PSS generation procedures for 3GPP LTE wireless communication system.
Figure 10:
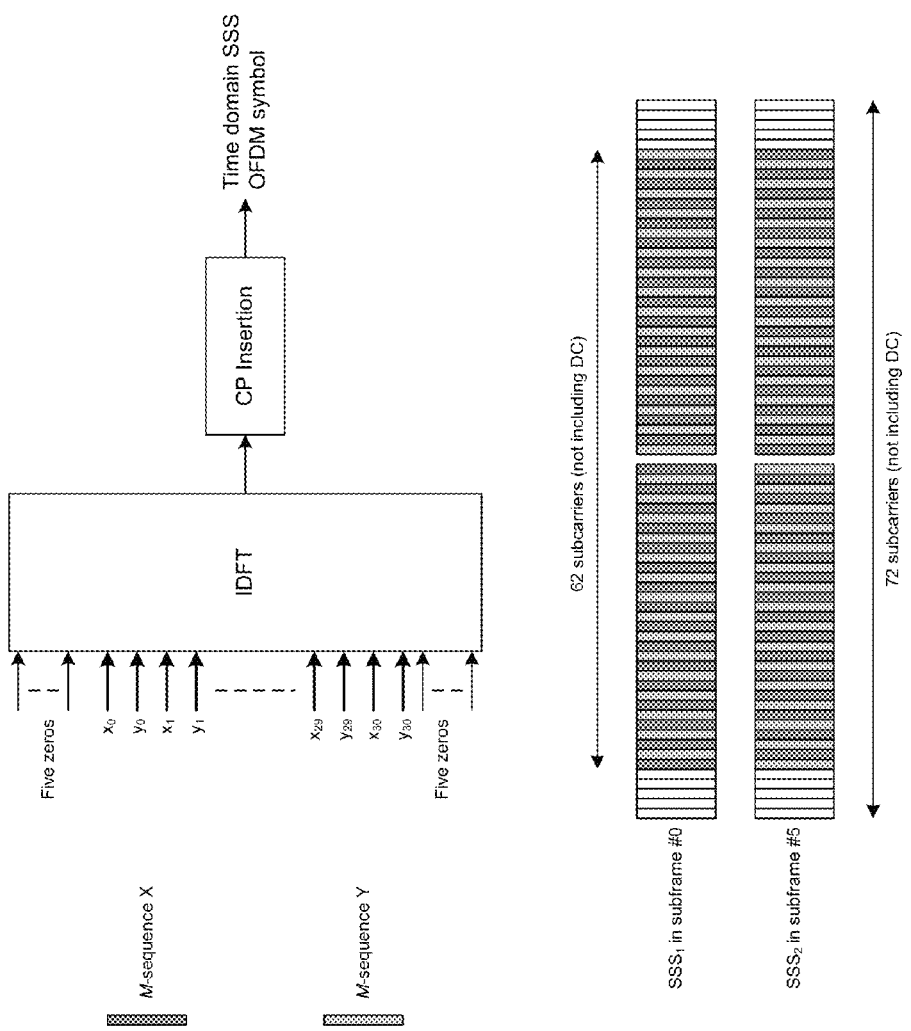
FIG. 10 illustrates SSS generation procedures for 3GPP LTE wireless communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Figure 11:
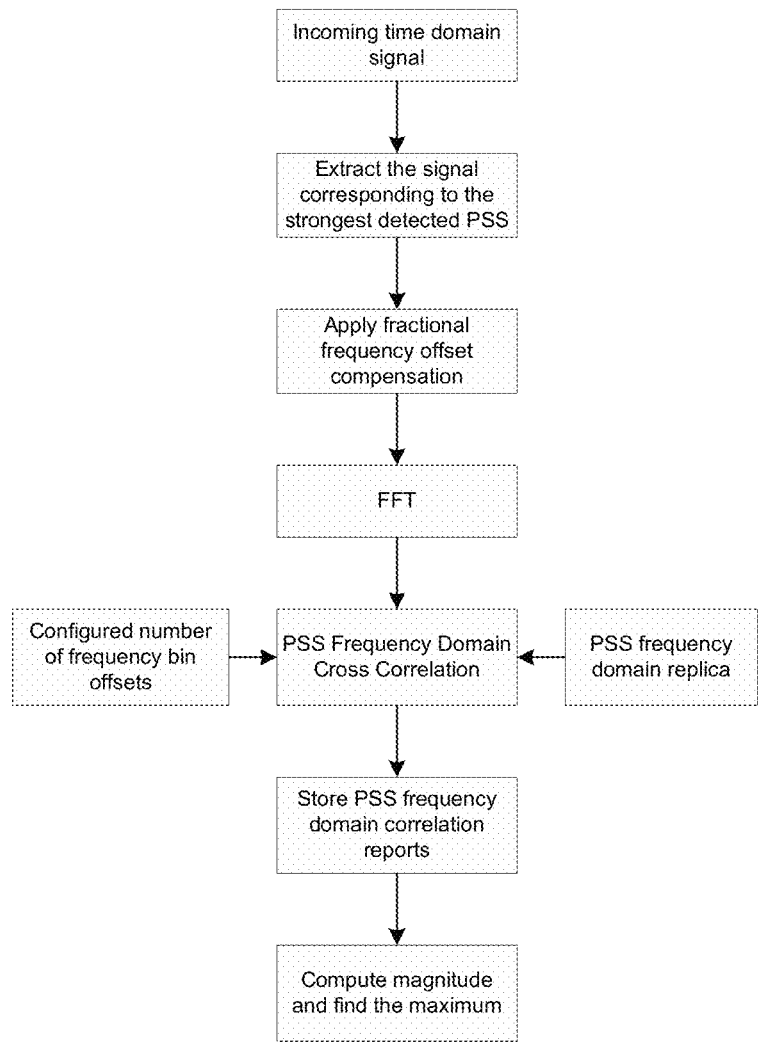
FIG. 11 illustrates a frequency domain PSS cross-correlation method for integer frequency offset estimation according to aspects of the present invention.

According to an aspect of the present invention, the fractional frequency offset present in the detected PSS signal is compensated by applying a phase rotation corresponding to the negative of the detected fractional frequency offset. The PSS detection may be performed using one of the conventional methods such as cross-correlation of incoming time domain signal with time domain local replica of all three possible PSS indices. The fractional frequency offset may be detected using one of the conventional methods such as CP correlation. According to an aspect of the present invention, the fractional frequency offset compensated PSS signal is then converted to frequency domain for integer frequency offset estimation. According to another aspect of the present invention, a local replica of the frequency domain PSS corresponding to the detected PSS index may be generated dynamically. According to another aspect of the present invention the local replica of the frequency domain PSS may be generated a priori and stored in a look-up table. According to an aspect of the present invention, the local replica of the frequency domain PSS corresponding to the detected PSS index may be cross-correlated with the frequency domain received signal corresponding to the detected PSS as shown in FIG. 11. According to another aspect of the present invention, the cross-correlation in frequency domain may be performed over a configurable number of frequency bin positions around the nominal position of PSS as shown in FIG. 11. According to another aspect of the present invention, the magnitude of the frequency domain cross-correlation may be computed and a maximum may be searched over all frequency bin positions over which the cross-correlation is computed. According to another aspect of the present invention, the frequency bin corresponding to the maximum cross-correlation magnitude may indicate the integer frequency offset present in the received signal. The detected integer frequency offset may be combined with the fractional frequency offset to compute the composite frequency offset. The composite frequency offset may then used to adjust the frequency of the oscillator used in the client terminal. For example, a Voltage Controlled Crystal Oscillator (VCXO), a Temperature Compensated Crystal Oscillator (TCXO), a Temperature Compensated Voltage Controlled Crystal Oscillator (TCVCXO), etc. may be used. According to another aspect of the invention, the SSS search may be performed over a signal which is fully compensated for frequency offset. The use of frequency offset compensated signal may enable improved SSS detection performance. This enables the SSS search to be performed only over the nominal SSS frequency bin position. This may reduce the complexity of the SSS search which in turn may reduce power consumption and may reduce the probability of detecting fake cells. The probability of detecting fake cells may be increased when a client terminal performs SSS search corresponding to different combinations of possible CP lengths and the different integer frequency offsets.

According to an aspect of the present invention, the frequency offset may be removed before the start of SSS search and SSS processing may be performed on frequency offset compensated signal. The SSS search may only need to handle the unknown CP type and duplexing type. According to an aspect of the present invention, even when there may be multiple detected PSS time offsets, the integer frequency offset detection may be performed only once. According to an aspect of the present invention, the integer frequency offset estimation based on PSS may be performed using the PSS signal corresponding to the strongest PSS time domain cross-correlation. The strongest PSS time domain correlation may be determined by computing the magnitude of the time domain cross-correlation of PSS. The SSS search may be performed on the frequency offset compensated signal corresponding to all the detected PSS time offsets of interest. The complexity of integer frequency offset estimation using PSS cross-correlation in frequency domain may be much less than integer frequency offset estimation using the SSS frequency domain processing. Therefore, significant processing reduction and power consumption reduction may be achieved when SSS search combinations are reduced.

Figure 12:
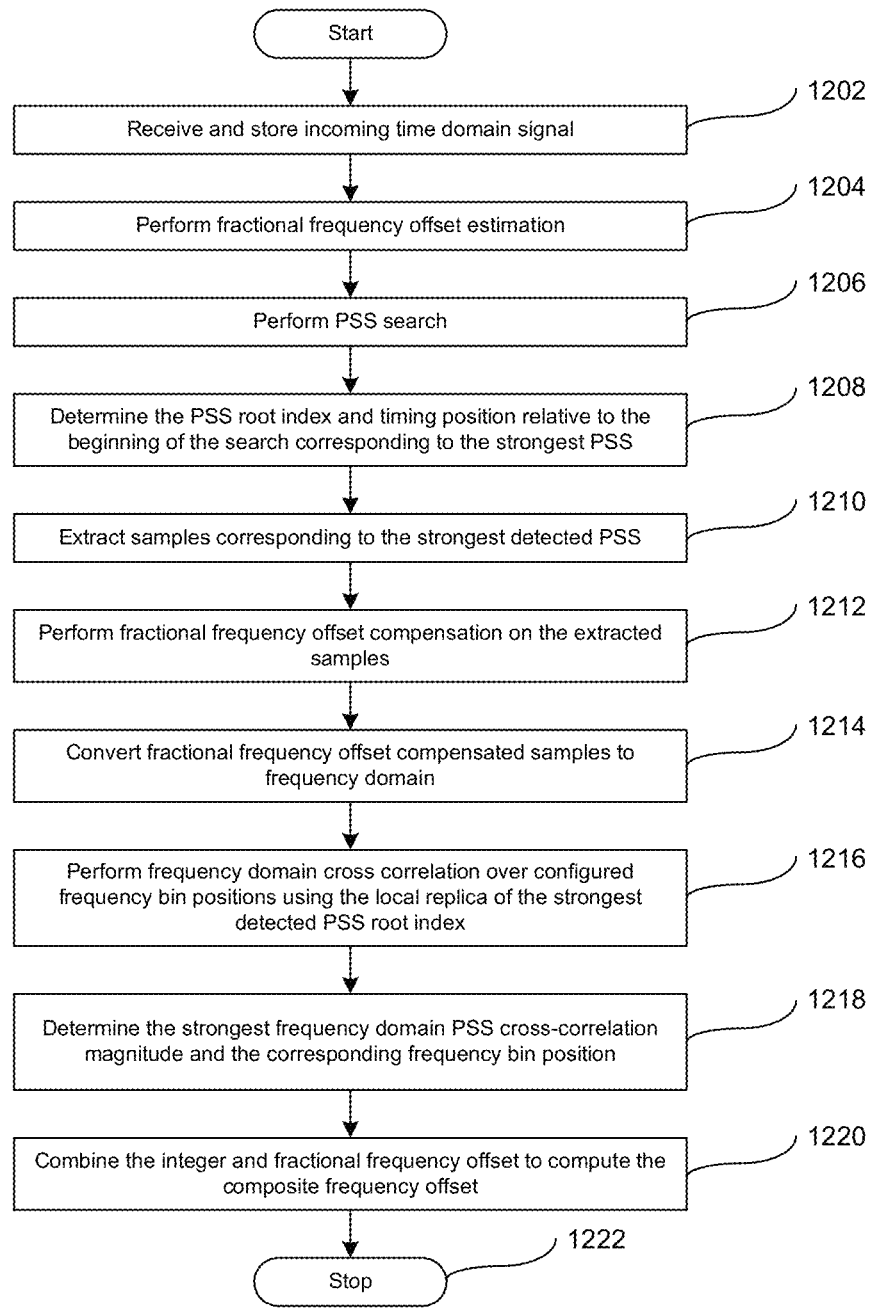
FIG. 12 illustrates an example flow diagram for processing steps according to aspects of the present invention.

The flow diagram 1200 contained in FIG. 12 illustrates an exemplary integer frequency offset determination method according to various aspects of the present invention. At processing stage 1202, the incoming time domain signal is received and stored. Aspects of the present invention may be implemented with or without storing the incoming time domain samples. At processing stage 1204, the fractional frequency offset estimation is performed. This may be done using conventional techniques such as CP correlation. At processing stage 1206, the PSS search operation is performed. This may be done using conventional techniques such as PSS time domain cross-correlation with local replicas of all three possible PSS indices. The processing in the processing stages 1204 and 1206 may be done in parallel or sequentially. Regardless of the method used, the processing continues at processing stage 1208 where the processing relevant to aspects of the present invention begins. At processing stage 1208, the PSS root index and timing position relative to the beginning of the PSS search window are determined for the strongest PSS detection metric, such as the cross-correlation magnitude. At processing stage 1210, the samples corresponding to the strongest PSS may be extracted from the stored samples. In an alternative embodiment, if the samples are not stored at processing stage, a new receive window may be opened to capture samples of another instance of the detected strongest PSS. Regardless of the method used, at processing stage 1212, the samples corresponding to the strongest PSS are compensated for the fractional frequency offset estimated in processing stage 1204. This may be accomplished by performing linear phase rotation corresponding to the negative of the detected fractional frequency offset. At processing stage 1214, the fractional frequency offset compensated samples are converted to frequency domain. At processing stage 1216, frequency domain cross-correlation is performed between the local frequency domain replica corresponding to the detected strongest PSS root index and the frequency domain samples of the received signal. At processing stage 1216, the cross-correlation is performed over the configured number of frequency bin positions. At processing stage 1218, a determination is made about the strongest frequency domain PSS cross-correlation magnitude and the corresponding frequency bin position. The frequency bin position corresponding to the strongest PSS frequency domain cross-correlation magnitude may be used as an indicator of the integer frequency offset. At processing stage 1220 the estimated fractional and integer frequency offset are combined to form a composite estimated frequency offset. The processing may terminate at stage 1222. The composite frequency offset may be used to adjust the local oscillator frequency to align with the frequency of the network.

Figure 13:
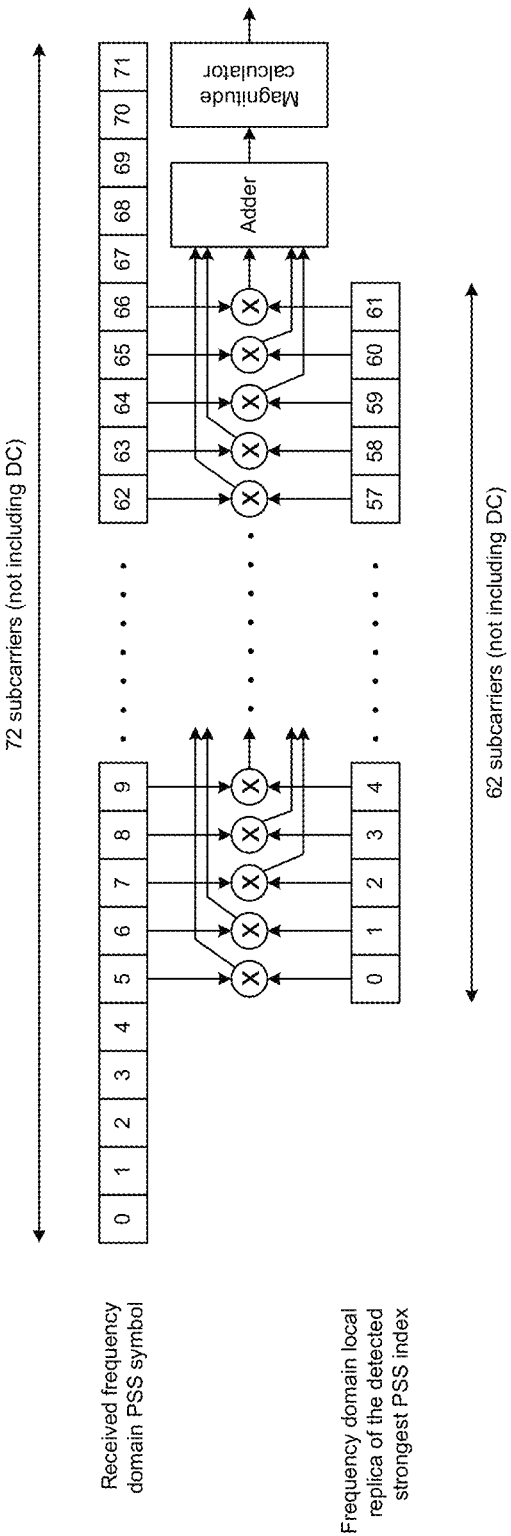
FIG. 13 illustrates a PSS frequency domain cross-correlation for nominal position according to aspects of the present invention.
Figure 14:
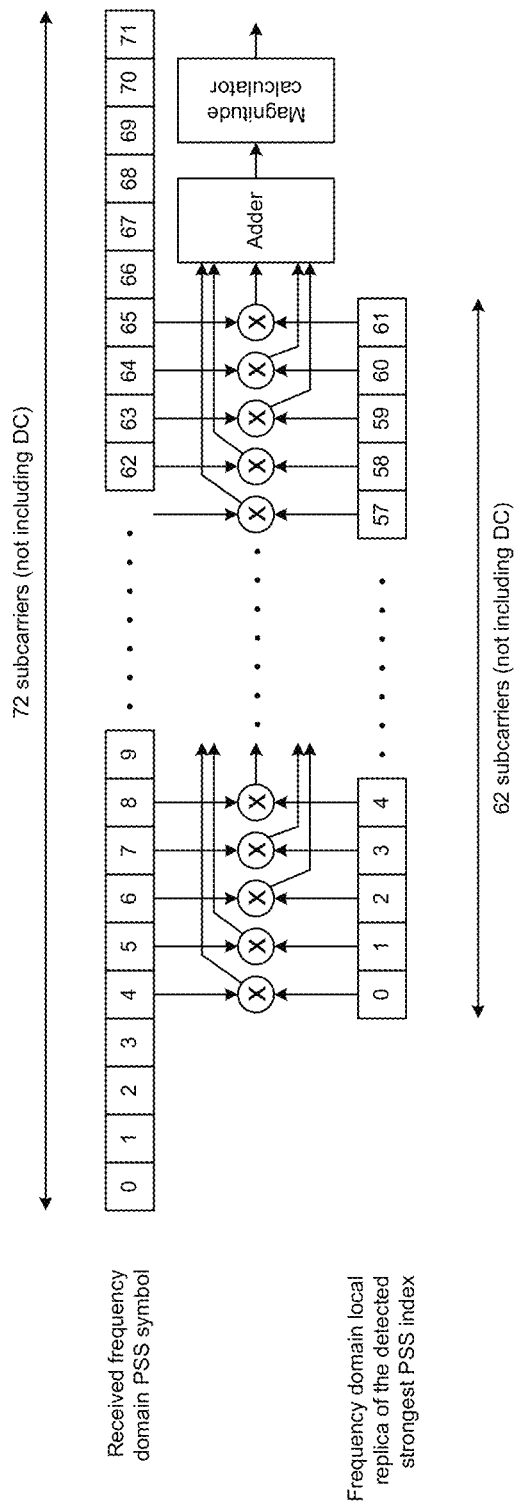
FIG. 14 illustrates a PSS frequency domain cross-correlation for one subcarrier offset corresponding to −15 kHz frequency offset according to aspects of the present invention.
Figure 15:
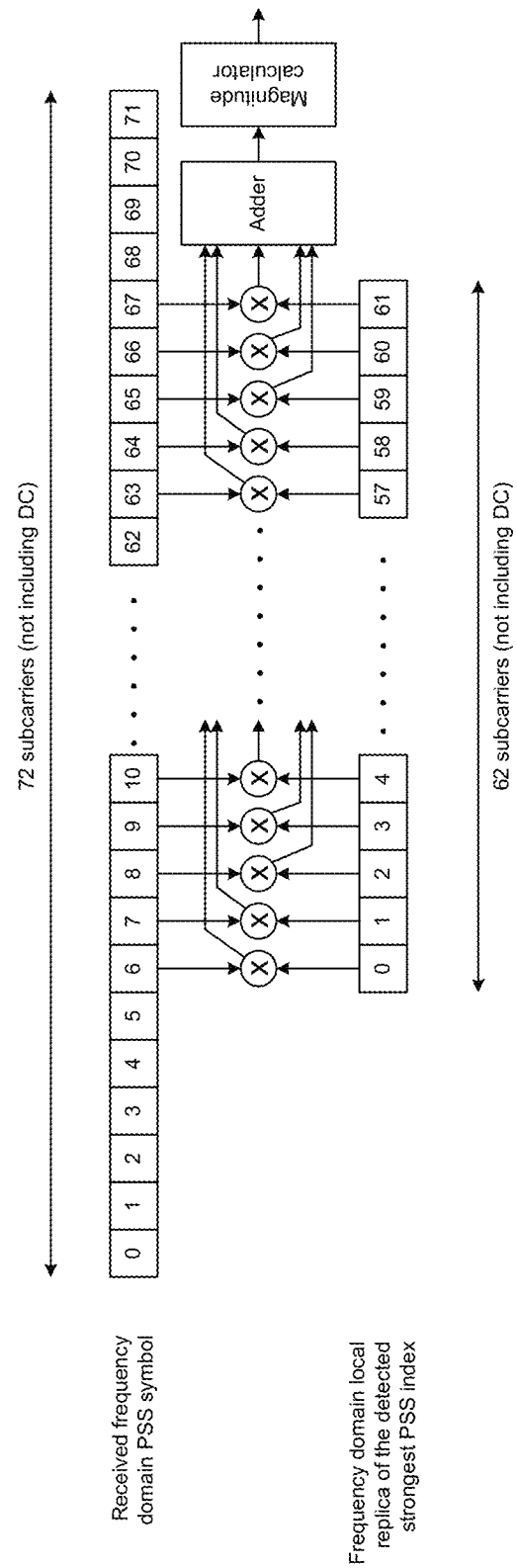
FIG. 15 illustrates a PSS frequency domain cross-correlation for one subcarrier offset corresponding to +15 kHz frequency offset according to aspects of the present invention.

The details of the frequency domain cross-correlation of the received PSS symbol with the local replica of the PSS index with the strongest time domain cross-correlation are shown in FIG. 13. The central 62 subcarriers from the received signal are multiplied with the conjugate frequency domain local replica of the PSS index on a subcarrier by subcarriers basis as shown in FIG. 13. The product of the multiplication from all 62 pairs is summed together. The output of the adder may be a complex number. The output of the adder is given to the magnitude calculator that performs the absolute value computation by taking the square root of the sum of the square of the real part and the imaginary part of the complex number, i.e., $\sqrt{real^2 + imag^2}$. Note that the local replica is aligned with the central 62 subcarriers of the received signal. To compute the frequency domain cross-correlation for one frequency bin offset, corresponding to integer frequency offset of −15 kHz (one subcarrier), the local replica is aligned with the received frequency domain signal as shown in FIG. 14. The first value of the conjugate of the local replica is multiplied with the fifth value of the received frequency domain signal, and so on. The rest of the cross-correlation computations remain the same as in FIG. 13. To compute the frequency domain cross-correlation for one frequency bin offset, corresponding to integer frequency offset of +15 kHz (one subcarrier), the local replica is aligned with the received frequency domain signal as shown in FIG. 15. The first value of the conjugate of the local replica is multiplied with the seventh value of the received frequency domain signal, and so on. The rest of the cross-correlation computations remain the same as in FIG. 13. The frequency domain PSS cross-correlation may be performed for as many expected integer frequency offsets as possible up to ±5 frequency bins.

By way of example only, the above-described method may be implemented in a receiver, e.g., a user device such as a wireless mobile station (MS) 12 as shown in FIG. 1.

Figure 16:
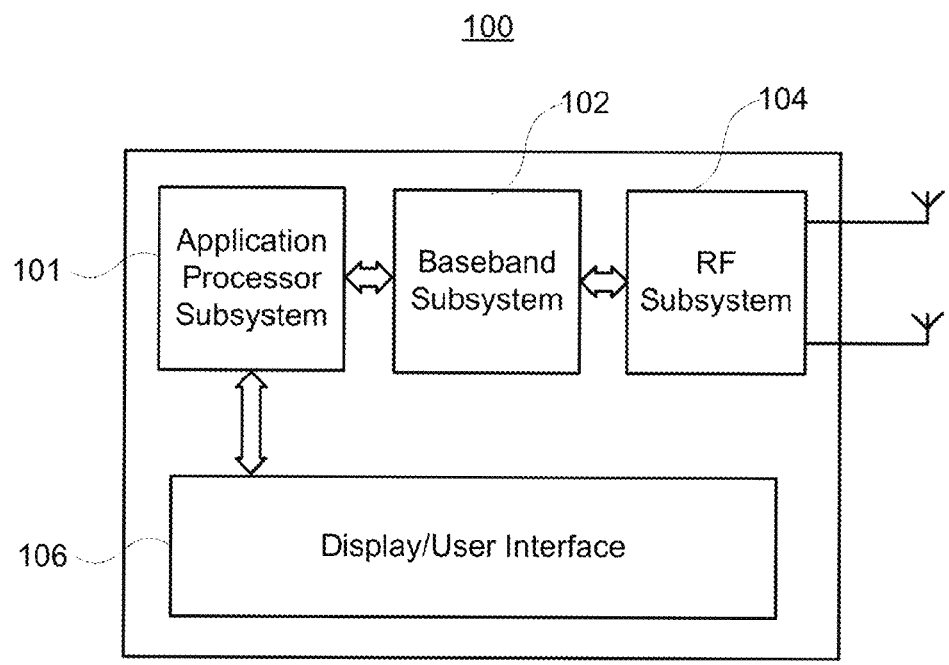
FIG. 16 illustrates a wireless mobile station diagram, which may be employed with aspects of the invention described herein.

As shown in FIG. 16, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 17:
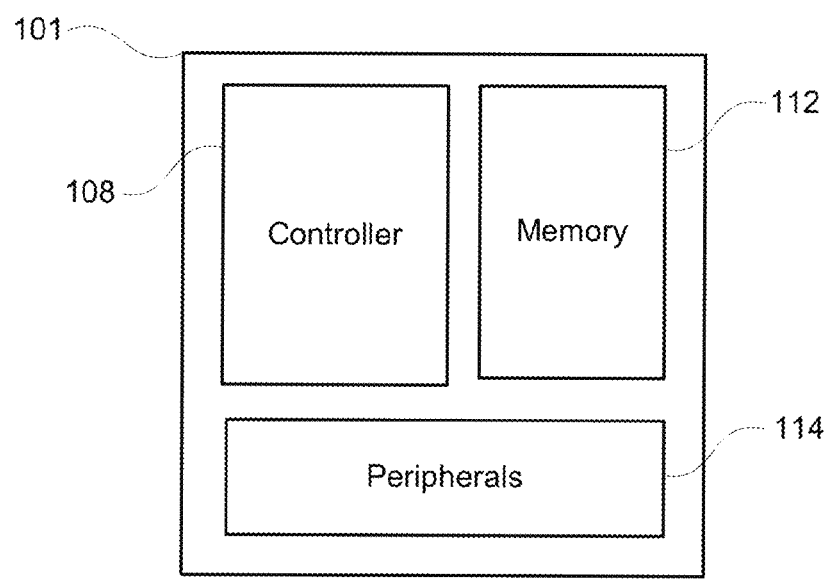
FIG. 17 illustrates an application processor subsystem for a wireless mobile station, which may be employed with aspects of the invention described herein.
Figure 18:
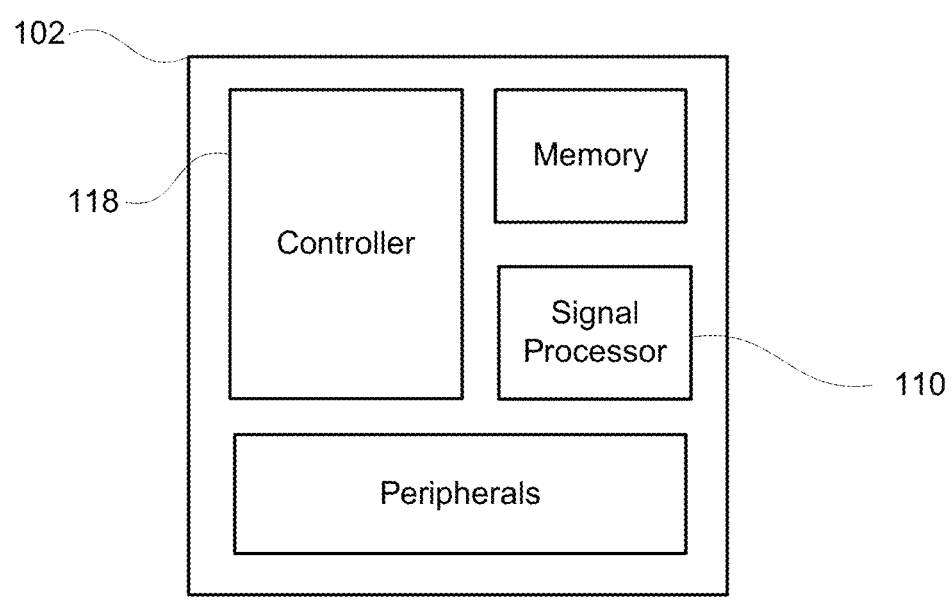
FIG. 18 illustrates a baseband subsystem for a wireless mobile station, which may be employed with aspects of the invention described herein.
Figure 19:
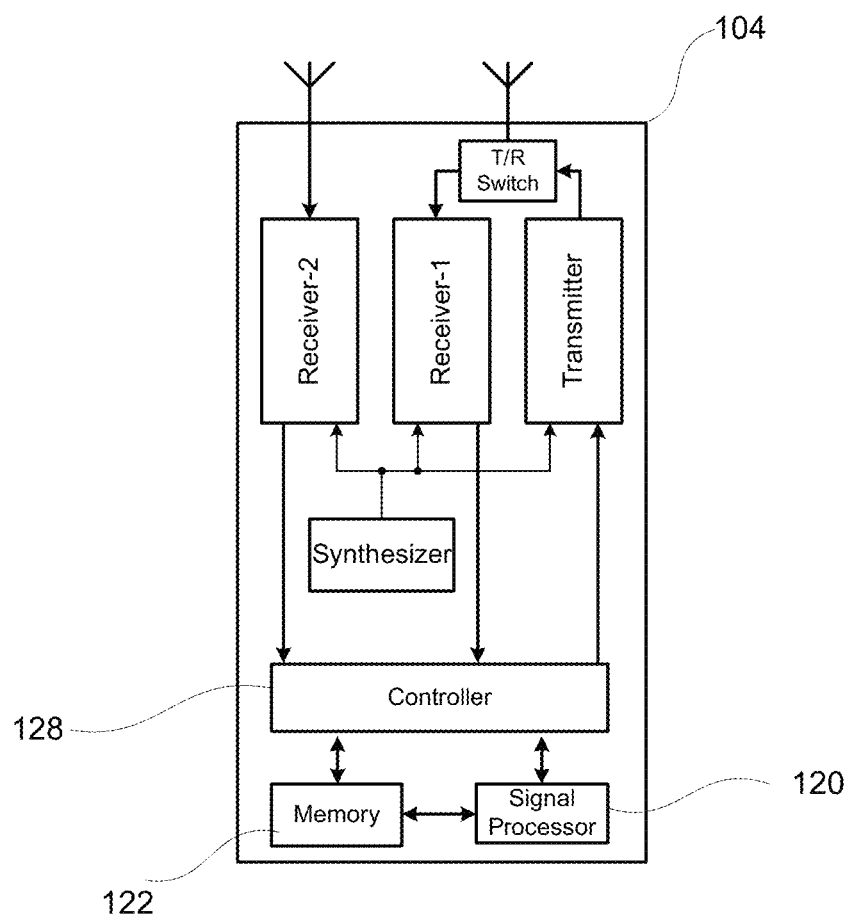
FIG. 19 illustrates an RF subsystem for a wireless mobile station, which may be employed with aspects of the invention described herein.

The application processor subsystem 101 as shown in FIG. 17 may include a controller 108 such as a microcontroller, another processor or other circuitry. The baseband subsystem 102 as shown in FIG. 18 may include a controller 118 such as a microcontroller or other processor. The RF subsystem 104 as shown in FIG. 19 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 18 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for frequency synchronization of a signal, the method comprising:
controlling, by a processing device:
extracting, from time domain samples of the signal, samples corresponding to a strongest detected Primary Synchronization Signal (PSS);
compensating the extracted samples for a fractional frequency offset detected from the time domain samples, by applying a phase rotation corresponding to a negative of the fractional frequency offset;
converting the compensated extracted samples to frequency domain samples;
frequency domain cross-correlating a replica of a frequency domain PSS corresponding to a PSS index of the strongest detected PSS with the frequency domain samples, over each frequency bin position of a predetermined number of frequency bin positions, for a plurality of frequency bin offsets to obtain respective frequency domain PSS cross-correlations; and
determining a single frequency bin position of the frequency bin positions corresponding to a frequency domain PSS cross-correlation of the frequency domain PSS cross-correlations having a maximum magnitude, wherein the determined frequency bin position indicates an integer frequency offset in the signal for frequency synchronization.

2. The method of claim 1, wherein the replica of the frequency domain PSS is generated dynamically.

3. The method of claim 1, wherein the replica of the frequency domain PSS is predetermined and stored in a look-up table.

4. The method of claim 1, wherein the frequency bin offsets are relative to a nominal position of the PSS.

5. The method of claim 1, further comprising:
controlling, by the processing device:
determining a frequency offset of the signal by combining the integer frequency offset indicated by the determined single frequency bin position with the fractional frequency offset, and
searching the signal compensated by the frequency offset for a Secondary Synchronization Signal (SSS).

6. The method of claim 1, wherein the strongest detected PSS corresponds to a strongest PSS time domain correlation.

7. The method of claim 6, wherein the strongest PSS time domain correlation is determined from a magnitude of a time domain cross-correlation of the PSS.

8. An apparatus for frequency synchronization of a signal, the apparatus comprising:
circuitry configured to control:
extracting, from time domain samples of the signal, samples corresponding to a strongest detected Primary Synchronization Signal (PSS);
compensating the extracted samples for a fractional frequency offset detected from the time domain samples, by applying a phase rotation corresponding to a negative of the fractional frequency offset;
converting the compensated extracted samples to frequency domain samples;
frequency domain cross-correlating a replica of a frequency domain PSS corresponding to a PSS index of the strongest detected PSS with the frequency domain samples, over each frequency bin position of a predetermined number of frequency bin positions, for a plurality of frequency bin offsets to obtain respective frequency domain PSS cross-correlations; and
determining a single frequency bin position of the frequency bin positions corresponding to a frequency domain PSS cross-correlation of the frequency domain PSS cross-correlations having a maximum magnitude, wherein the determined frequency bin position indicates an integer frequency offset in the signal.

9. The apparatus of claim 8, wherein the replica of the frequency domain PSS is generated dynamically.

10. The apparatus of claim 8, wherein the replica of the frequency domain PSS is predetermined and stored in a look-up table.

11. The apparatus of claim 8, wherein the frequency bin offsets are relative to a nominal position of the PSS.

12. The apparatus of claim 8,
wherein the circuitry is configured to control:
determining a frequency offset of the signal by combining the integer frequency offset indicated by the determined single frequency bin position with the fractional frequency offset, and
searching the signal compensated by the frequency offset for a Secondary Synchronization Signal (SSS).

13. The apparatus of claim 8, wherein the strongest detected PSS corresponds to a strongest PSS time domain correlation.

14. The method of claim 13, wherein the strongest PSS time domain correlation is determined from a magnitude of a time domain cross-correlation of the PSS.

15. A wireless communication device comprising:
a receiver to receive a signal; and
a processing device configured to control frequency synchronization of the signal, by controlling:
extracting, from time domain samples of the signal, samples corresponding to a strongest detected Primary Synchronization Signal (PSS);
compensating the extracted samples for a fractional frequency offset detected from the time domain samples, by applying a phase rotation corresponding to a negative of the fractional frequency offset;
converting the compensated extracted samples to frequency domain samples;
frequency domain cross-correlating a replica of a frequency domain PSS corresponding to a PSS index of the strongest detected PSS with the frequency domain samples, over each frequency bin position of a predetermined number of frequency bin positions, for a plurality of frequency bin offsets to obtain respective frequency domain PSS cross-correlations; and
determining a single frequency bin position of the frequency bin positions corresponding to a frequency domain PSS cross-correlation of the frequency domain PSS cross-correlations having a maximum magnitude, wherein the determined frequency bin position indicates an integer frequency offset in the signal.

16. The device of claim 15, wherein the replica of the frequency domain PSS is generated dynamically.

17. The device of claim 15, wherein the replica of the frequency domain PSS is predetermined and stored in a look-up table.

18. The device of claim 15, wherein the frequency bin offsets are relative to a nominal position of the PSS.

19. The device of claim 15,
wherein the processing device is configured to control:
determining a frequency offset of the signal by combining the integer frequency offset indicated by the determined single frequency bin position with the fractional frequency offset, and
searching the signal compensated by the frequency offset for a Secondary Synchronization Signal (SSS).

20. The device of claim 15, wherein the strongest detected PSS corresponds to a strongest PSS time domain correlation.

* * * * *